(12) United States Patent
Gagnon et al.

(10) Patent No.: US 11,965,617 B2
(45) Date of Patent: Apr. 23, 2024

(54) METHOD AND SYSTEM FOR PRESSURE PIPE DRILLING CEMENT-MORTAR LINED AND COATED STEEL CYLINDERS

(71) Applicant: SANEXEN ENVIRONMENTAL SERVICES INC., Brossard (CA)

(72) Inventors: Gilles Gagnon, Repentigny (CA); Michael Davison, Brossard (CA); Martin Bureau, Montreal (CA)

(73) Assignee: SANEXEN ENVIRONMENTAL SERVICES INC., Brossard (CA)

( * ) Notice: Subject to any disclaimer, the term of this patent is extended or adjusted under 35 U.S.C. 154(b) by 439 days.

(21) Appl. No.: 17/446,851

(22) Filed: Sep. 3, 2021

(65) Prior Publication Data

US 2022/0090721 A1    Mar. 24, 2022

Related U.S. Application Data

(60) Provisional application No. 63/080,022, filed on Sep. 18, 2020.

(51) Int. Cl.
*F16L 41/06* (2006.01)
(52) U.S. Cl.
CPC .................................. *F16L 41/06* (2013.01)

(58) Field of Classification Search
CPC ....... F16L 41/002; F16L 41/028; F16L 41/06; F16L 55/164
See application file for complete search history.

(56) References Cited

U.S. PATENT DOCUMENTS

| | | | | | |
|---|---|---|---|---|---|
| 2,100,884 | A | * | 11/1937 | Trickey | F16L 41/002 285/423 |
| 3,355,529 | A | * | 11/1967 | Easterday | F16L 41/002 264/32 |
| 3,364,939 | A | * | 1/1968 | Valenziano | F16L 41/002 408/1 R |
| 5,076,311 | A | * | 12/1991 | Marschke | F16L 55/105 408/206 |
| 5,842,496 | A | * | 12/1998 | Delanty | F16L 41/06 156/303.1 |
| 2016/0146389 | A1 | * | 5/2016 | Alotaibi | F16L 41/06 137/15.12 |
| 2017/0122481 | A1 | * | 5/2017 | Czaplewski | F16L 55/164 |
| 2019/0226622 | A1 | * | 7/2019 | Weisenberg | F16L 55/32 |

* cited by examiner

*Primary Examiner* — Reinaldo Sanchez-Medina
(74) *Attorney, Agent, or Firm* — LAVERY, DE BILLY, LLP; Gwendoline Bruneau

(57) ABSTRACT

A method for pressure pipe drilling a pipe comprising an exterior layer and an interior layer, the method comprising internally lining the pipe with a fluid-tight sheath; drilling a first cavity through the exterior layer until exposing the interior layer; injecting a sealant into the first cavity; and drilling a second cavity within the first cavity through the interior layer and the fluid-tight sheath.

20 Claims, 14 Drawing Sheets

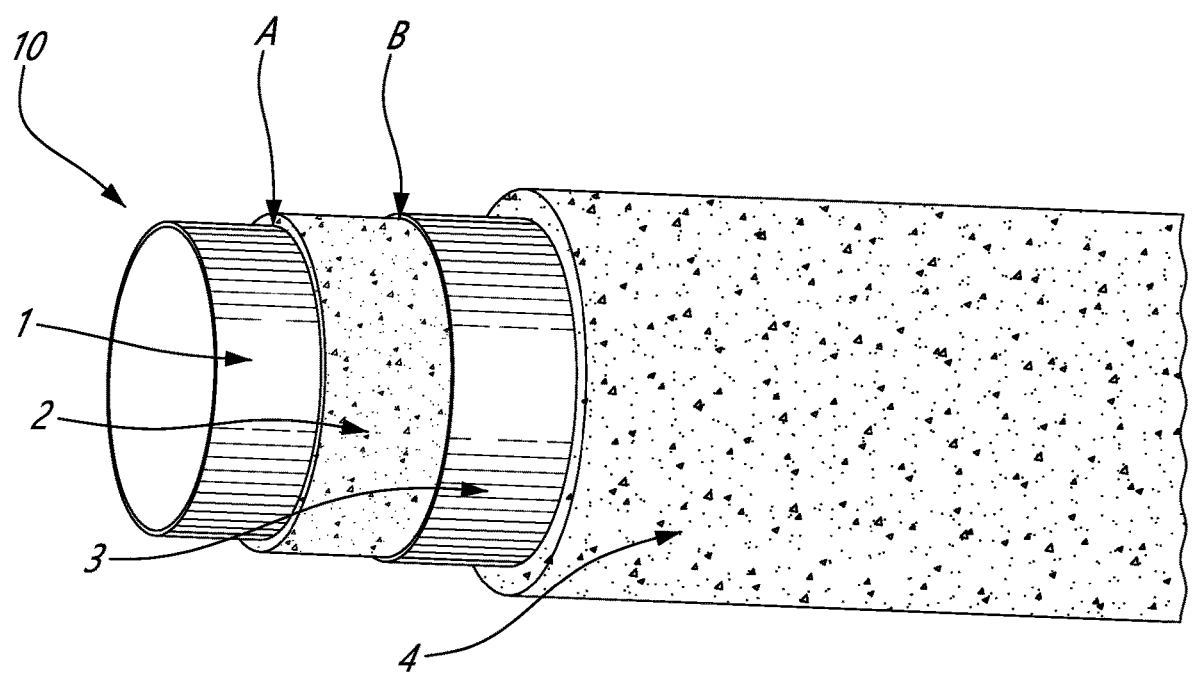

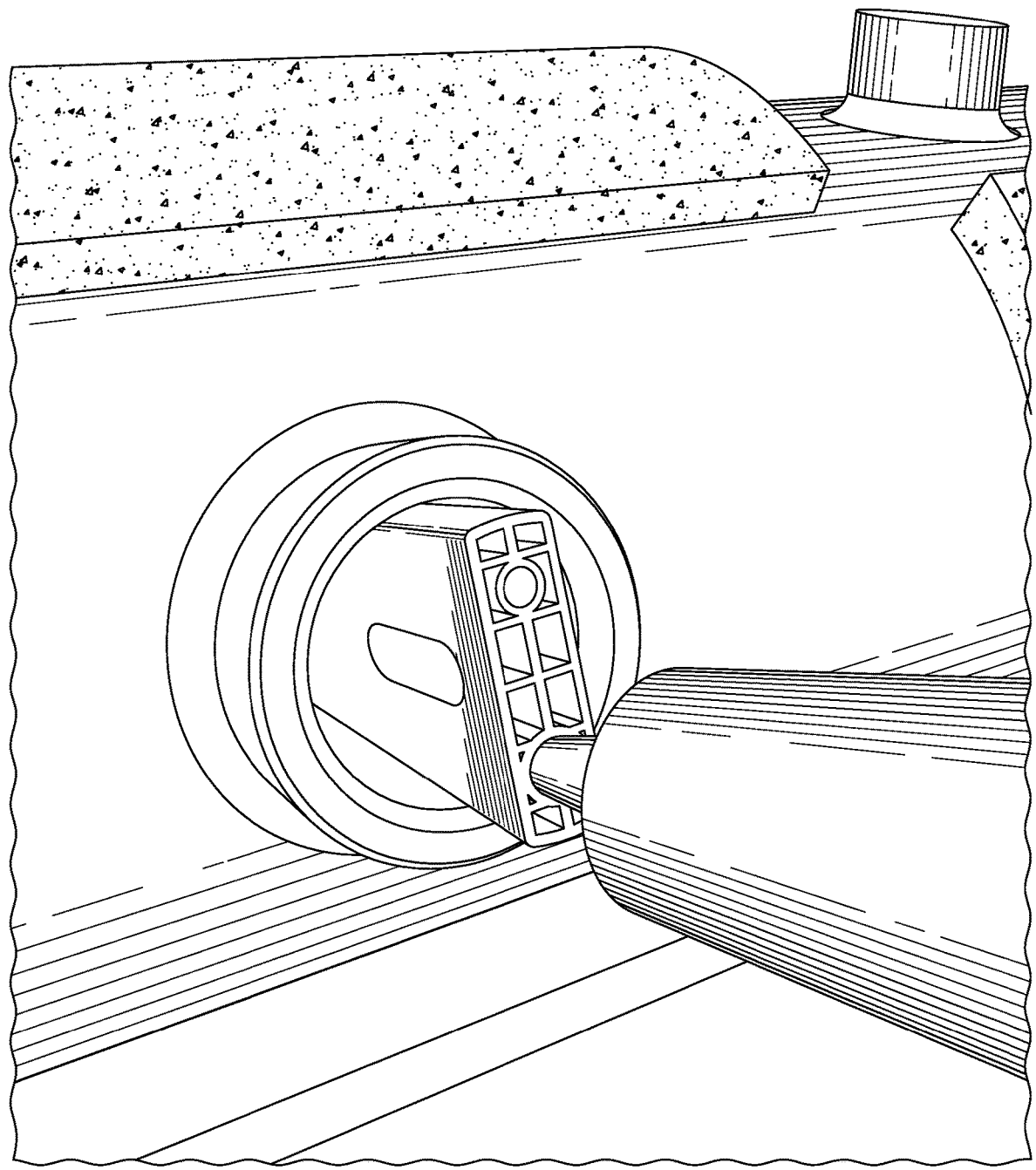

METHOD AND SYSTEM FOR PRESSURE PIPE DRILLING CEMENT-MORTAR LINED AND COATED STEEL CYLINDERS

CROSS REFERENCE TO RELATED APPLICATIONS

This application claims benefit of U.S. provisional application Ser. No. 63/080,022, filed on Sep. 18, 2020. All documents above are incorporated herein in their entirety by reference.

FIELD OF THE INVENTION

The present invention relates to pressure pipe drilling. More specifically, the present invention is concerned with a method for pressure pipe drilling on cement-mortar lined and coated steel cylinders.

BACKGROUND OF THE INVENTION

Water distributions systems consist of pipes, pumps, valves, storage tanks, reservoirs, meters, fittings, and other hydraulic devices, in infrastructures configured to carry drinking water from a centralized treatment plant or well supplies to consumers' taps.

Water mains are used to transport water within a distribution system. Large diameter water mains called primary feeders are used to connect between water treatment plants and service areas. PVC, ductile iron pipes, steel cylinders, and cement-mortar lined and coated steel (CMLC). Pipes used for water mains are typically submitted to working water pressure of at least 150 psi. Once installed, they may need to be accessed for maintenance and repair.

Secondary feeders are connected between primary feeders and distributors. Distributors are water mains that are located near the water users, which also supply water to individual fire hydrants. A service line is a small diameter pipe used to connect from a water main through a small tap to a water meter at user's location.

Shutting down the whole system to insert a tap in an existing water main involves a number of costly operations, such as pipe dewatering and subsequent water testing for bacteria according to regulations for drinking water once the system is turned on again.

PVC, ductile iron pipes and steel cylinders may be safely tied into the system while the system is under pressure, in hot tapping or wet tapping, thus avoiding pipe dewatering and subsequent operations to resume water servicing. Moreover hot tapping does not to impact their service and pressure. Hot Tapping is the ability to safely tie into a pressurized system, is done by drilling or cutting, while the system is on stream and under pressure, placing a tapping coupling onto the water main, in addition to a gate or ball valve that controls the water at that line. Once the coupling and the valve are in place, the main is tapped. Once the drill is pulled back, the valve is closed, keeping water from leaking out of the main. In case of mains in other materials, such as cement-mortar lined and coated steel (CLMC), hot tapping may lead to corrosion issues and eventual loss of water tightness at the tap-pipe connection.

There is still a need in the art for a method and a system for pressure pipe drilling cement-mortar lined and coated steel cylinders.

SUMMARY OF THE INVENTION

More specifically, in accordance with the present invention, there is provided a method for pressure pipe drilling a pipe comprising an exterior layer and an interior layer, the method comprising internally lining the pipe with a fluid-tight sheath; drilling a first cavity through the exterior layer until exposing the interior layer; injecting a sealant into the first cavity; and drilling a second cavity within the first cavity through the interior layer and the fluid-tight sheath.

There is further provided a method for pressure pipe drilling a pipe, comprising internally lining the pipe with a fluid-tight sheath, drilling to expose an outer surface of on innermost layer of the pipe thereby forming a first cavity, sealing walls of the first cavity, and drilling a second cavity in the first cavity through the innermost layer and the fluid tight sheath, the second cavity opening inside the pipe.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 shows a pipe according to an embodiment of an aspect of the present disclosure;

FIG. 11, FIG. 12 and FIG. 13 show sealant injection according to an embodiment of an aspect of the present disclosure.

DESCRIPTION OF ILLUSTRATIVE EMBODIMENTS

Figure 2A:
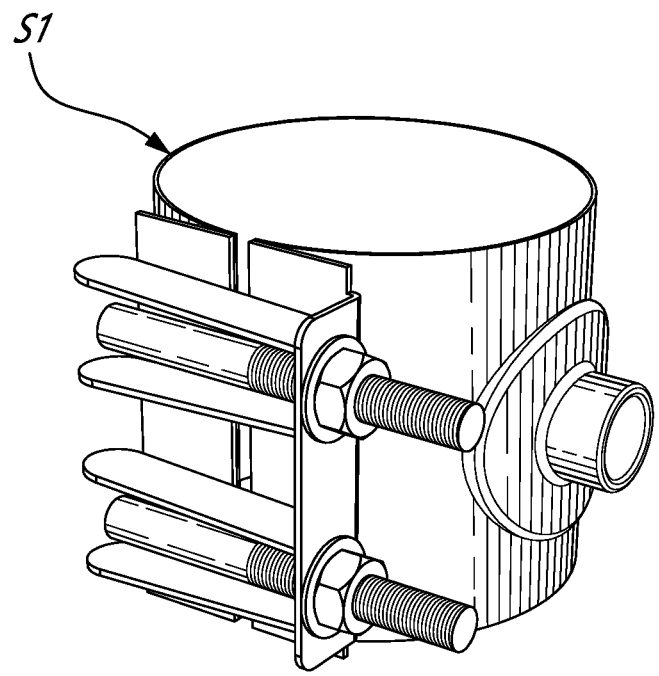
FIG. 2A show a saddle used in tests according to an embodiment of an aspect of the present disclosure.

The present invention is illustrated in further details by the following non-limiting examples.

A pipe of the present disclosure typically comprises a number of cylindrical tubular elements, including an exterior tubular element and an interior tubular element, and a number of intermediate tubular elements such as lining and sealing layers for example. The specific chemical-physical parameters, including the material and the thickness of each tubular element is selected depending on physico-chemical properties at the interfaces between the different tubular elements, according to a target application and the environment of operation of the pipe.

A cement-mortar lined and coated steel (CLMC) pipe 10 illustrated in FIG. 1 for example comprises a steel cylinder (3) coated with a concentric exterior concrete coating (4) and lined with an internal cement mortar lining (2), and an interior sealing layer (1) within the internal cement mortar lining (2). A steel cable may be spiraled within the exterior concrete coating (4) to limit external tensile hoop stresses within the exterior concrete coating (4) under compressive hoop stresses. For a nominal external diameter of 10.20 inch of the pipe for example, the exterior concrete coating (4) may be ¾ inch thick, the steel cylinder (3) ⅛ inch thick, the internal cement mortar lining (2) 5/16 inch thick, and the interior sealing layer (1) a thin 1/16 inch thick layer for example.

The physico-chemical properties of the different layers and at the interfaces between the different layers may cause degradation upon operation of the pipe. For example, when the wall of the pipe is drilled to provide a fluid communication between the outside and the inside of the pipe in hot tapping, the material of each consecutive layers is exposed. In case of porous or low corrosion or resistance or other physico-chemical reactions when in contact to the fluid, the materials may degrade, leading to degraded fluid tightness of the taps and leakage of the pipe over time.

For hot tapping the pipe of FIG. 1 for example, a hole is drilled through the exterior concrete coating (4) and the steel cylinder (3), the internal cement mortar lining (2) and the interior sealing layer (1) to reach the inside of the pipe. Corrosion or other physico-chemical reaction of exposed cement and/or steel when in contact with water may occur, and cause water tightness issues and potential leakage through the layers and/or at interfaces between the layers. The porosity of concrete and cement mortar provides channels for liquids to leak through, and the water tightness of interior wall of the pipe is at risk. Such channels may also form at the interface A between the interior sealing layer (1) and the internal cement mortar lining (2), and the interface B between the internal cement mortar lining (2) and the steel cylinder (3) shown in FIG. 1. In all cases, the drilled-wall structure may thus fail to retain its water tightness and may cause connected water leakages along the length of the pipe.

Figure 2B:
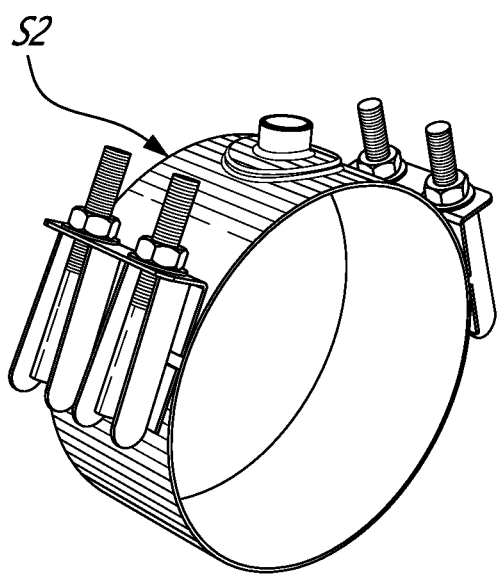
FIG. 2B show a saddle used in tests according to an embodiment of an aspect of the present disclosure.
Figure 3A:
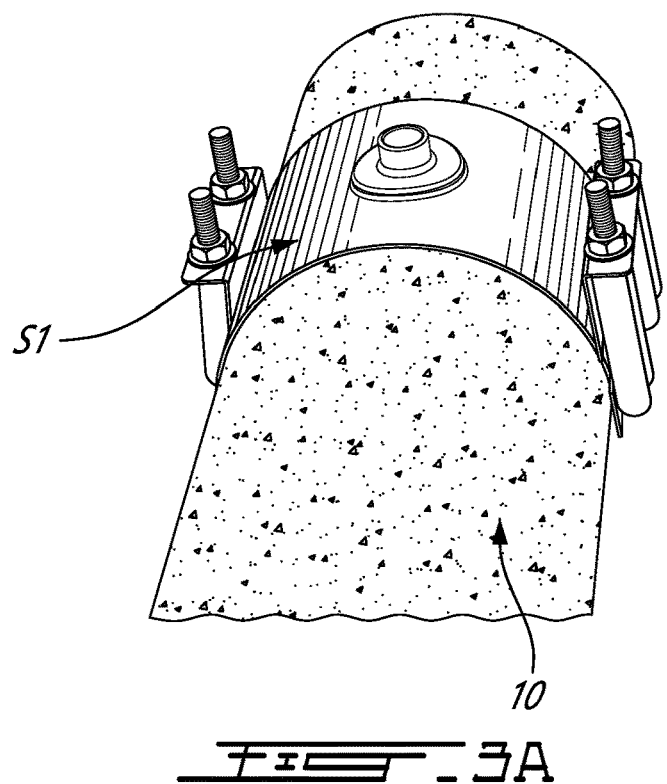
FIGS. 3A and 3B show steps of a method according to an embodiment of an aspect of the present disclosure.
Figure 3B:
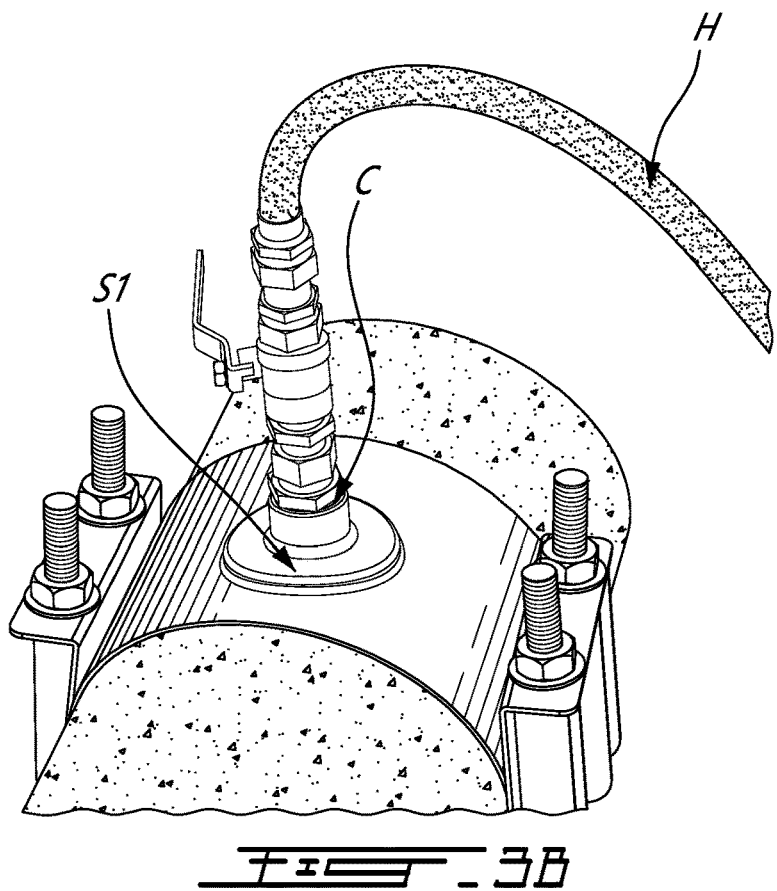
Figure 4A:
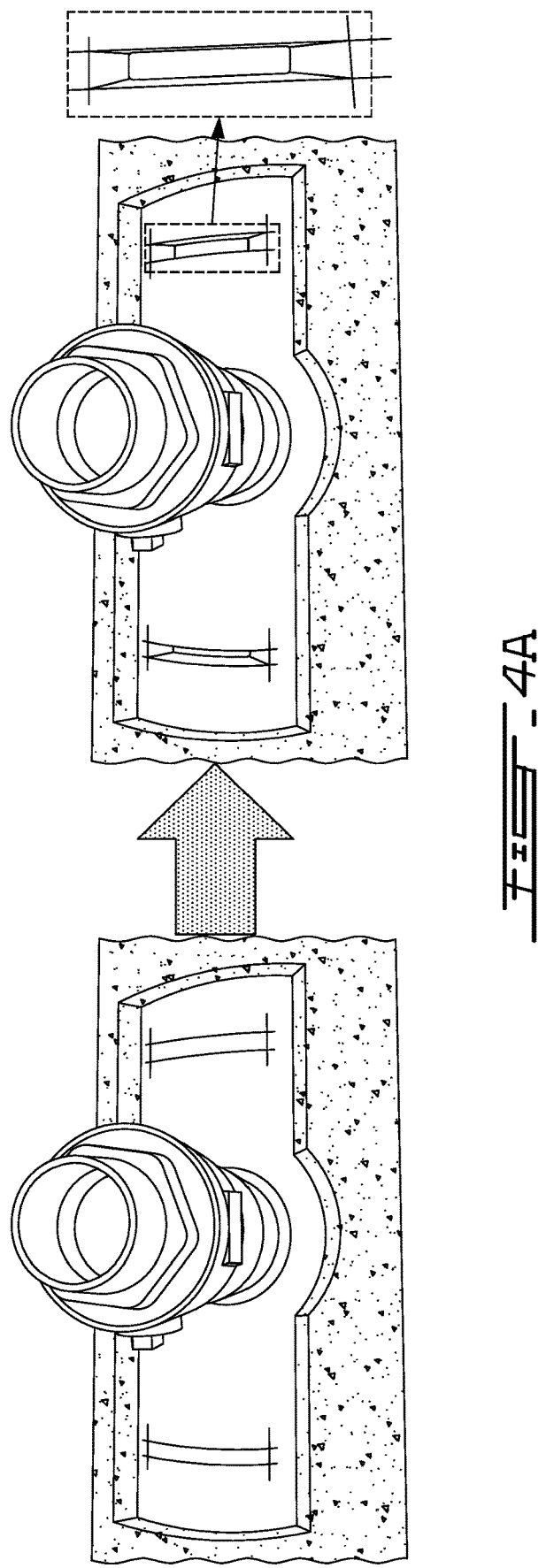
FIGS. 4A-4D show steps of experiments according to an embodiment of an aspect of the present disclosure.
Figure 4D:
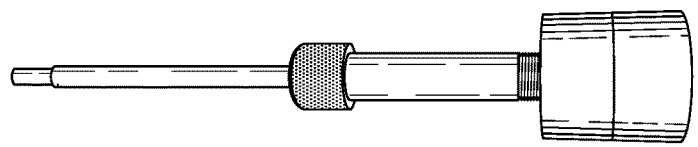
Figure 4C:
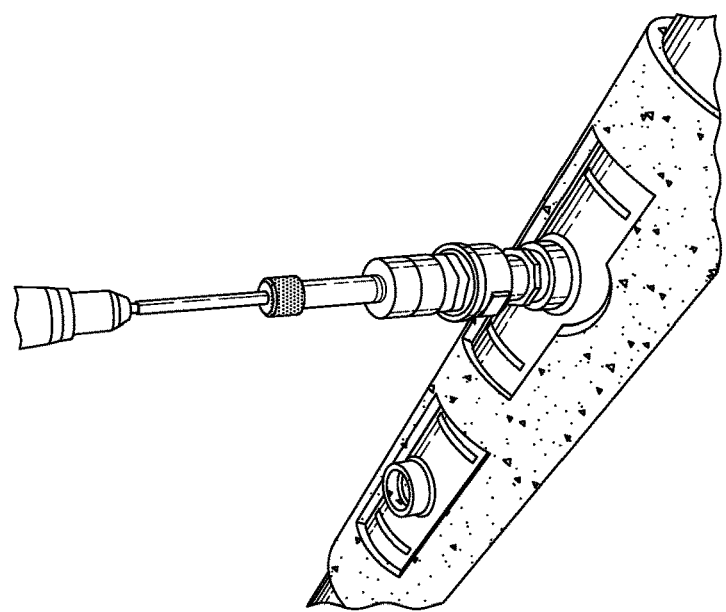
Figure 4B:
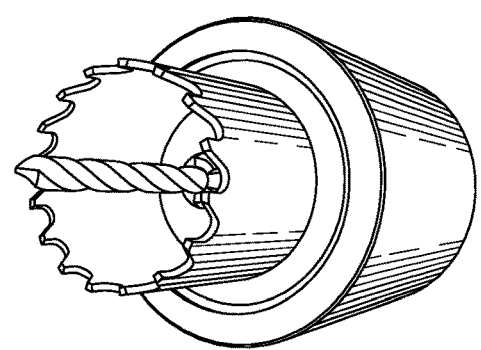
Figure 5B:
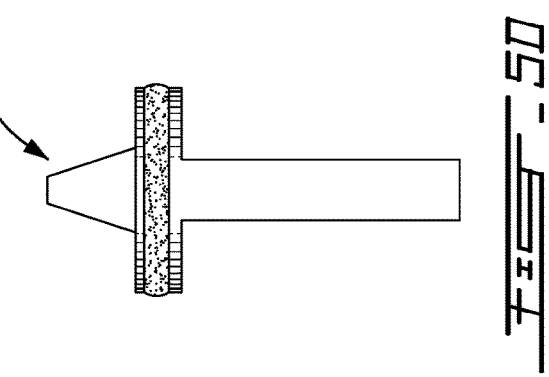
FIG. 5B is a top view of the injector of FIG. 5A.
Figure 5A:
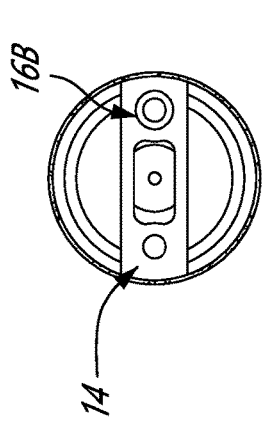
FIG. 5A is a perspective view, with a bottom half cut of section, of an injector according to an embodiment of an aspect of the present disclosure.
Figure 5D:
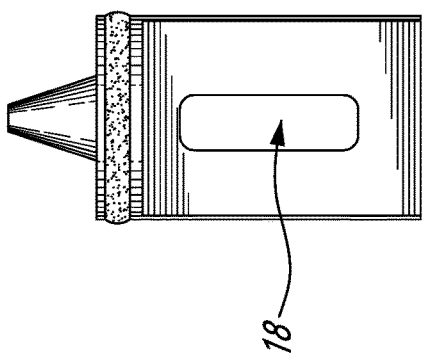
FIG. 5D is a side view of the injector of FIG. 5A.
Figure 5C:
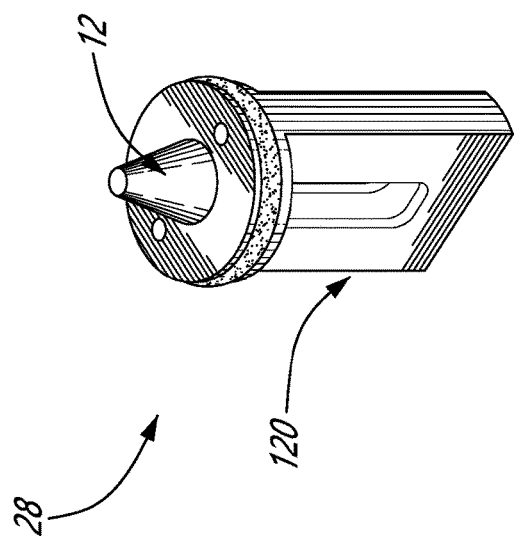
FIG. 5C is a front view of the injector of FIG. 5A.
Figure 6:
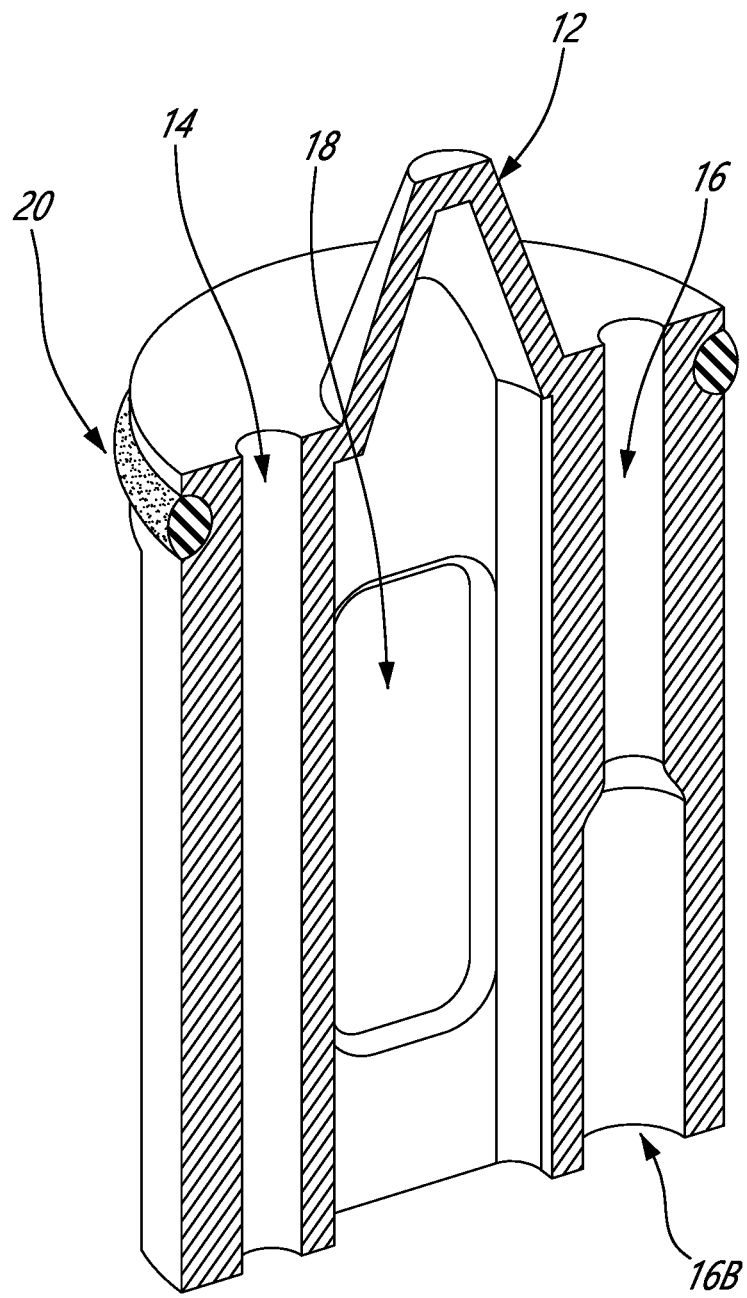
FIG. 6 is a cross section view of an injector according to an embodiment of an aspect of the present disclosure.

Tests of liquid tightness were done using two different saddles (see FIGS. 2A and 2B) mounted on the pipe as described hereinabove. In FIG. 3A, the saddle S1 of FIG. 2A is mounted on the pipe and tightened thereto by nuts. As shown in FIG. 3B, a garden pipe H is connected to the saddle S1 using a coupling C, such as a length of pipe or tube with a socket at one or both ends that allows two pipes or tubes to be joined as known in the art. Then the saddle S1 is put under pressure and water leaks under the saddle S1 are monitored. The same is done using the saddle S2 of FIG. 2B. In both cases, water leaks were detected below the saddles.

In further tests, the pipe is lined with a fluid-tight cured in-place internal sheath (7) (see FIG. 9) onto the inner wall of the interior sealing layer (1). The cured in-place internal sheath (7) is a double layer, seamless tubular woven fabric with a polymeric membrane bonded to the inside to ensure water tightness, impregnated with epoxy resin and is inserted into the pipe. The pipe is then put under a pressure in a range between about 20 and about 30 psi with water circulating in closed loop, for curing the resin by circulating heated water until complete hardening. Tests of liquid tightness were then done using the two different saddles (see FIGS. 2A and 2B) mounted on the thus internally lined pipe, Under a first leakage test as described hereinabove in relation to FIG. 3, water links were still detected below the saddles S1 and S2.

In a next experiment, once the pipe is lined with the fluid-tight cured in-place internal sheath (7) onto the inner wall of the interior sealing layer (1) (see FIG. 9), a cavity C is drilled in the exterior concrete coating (4) to reach the outer surface of the steel cylinder (3) and a coupling 30 is welded on the surface of the steel cylinder (3), by stick-shielded metal arc welding (SMAW), or gas metal arc welding (GMAW), gas tungsten arc welding (GTAW), or flux-cored arc welding (FCAW) for example. In view of further tightness tests, concrete coating is removed to form windows exposing the surface of the steel cylinder (3) on both sides of the coupling 30 (see for example FIG. 4), and grooves are machined on the steel cylinder (3) wall. The cavity C is further drilled through the steel cylinder (3) and the internal cement mortar lining (2) underneath, until reaching the outer surface of the interior sealing layer (1) to expose the interior sealing layer (1) without piercing the interior sealing layer (1). For testing, a valve is fixed on the coupling for tapping through the cavity C using a removable tapping tool while maintaining water pressure within the coupling. Water infiltration through the internal layers of the internally lined pipe is observed and water leakage is observed through the windows.

In a further experiment, the pipe is lined with the fluid-tight cured in-place internal sheath (7) (see FIG. 9) onto the inner wall of the interior sealing layer (1). The dosage of resin is controlled and adjusted to ensure any empty open volumes within the interior wall of the pipe is filled with resin along the length of the cured in-place internal sheath (7) upstream of the position selected for hot tapping along the pipe is filled with resin and the resin efficiently seals the length of the cured in-place internal sheath (7) from the inside of the pipe wall opposite the hot tapping position on the outside of the pipe wall, so as to ensure complete sealant impregnation and filling of any empty volumes in the pipe wall second cavity into the interior of the pipe along the length of the cured in-place internal sheath (7) upstream of the position selected for hot tapping along the pipe, including previous taps closed from the outside of the pipe but still open along the interior surface of the pipe. Then, a first cavity is drilled through the steel cylinder (3) and the internal cement mortar lining (2) underneath, until reaching the outer surface of the interior sealing layer (1) to expose the outer surface of the interior sealing layer (1) without piercing the interior sealing layer (1), and the drilling tool is removed. Then, a cavity epoxy sealant is cast into the cavity thus drilled to wet and impregnate the wall of the first cavity, including the interface between the coupling (30) and the steel cylinder (3) and the interface between the steel cylinder (3) and the internal cement mortar liner (2), and the epoxy sealant is allowed to cure. Once the epoxy sealant is completely hardened, the drilling tool is reinstalled. In a second drilling pass, a second cavity is drilled through the interior sealing layer (1) and the internal sheath (7). The second cavity is of a smaller diameter than the first cavity, which wall and interfaces have previously been sealed. Under tests as described hereinabove, water infiltration is not observed through the internal layers of the pipe and no liquid leakage is observed through the windows.

The first cavity sealant is selected as an injectable material that is confinable by the wall of the first cavity, and is fluid compatible as dictated by the target application. Epoxy resins, injectable foams or cements may be used for example.

The first cavity sealant may be injected within the first cavity using an injector comprising a generally cylindrical body 10 of the diameter of the second cavity of the coupling 30 (FIGS. 5-9). An O-Ring 20 used to seal the circumferential surface between the inner surface of the second cavity of the coupling 30 weld on the exterior surface of the steel cylinder (3) and the injector 28 is shown. An injection channel 16 runs through the body from an input port 16B at the top of the body to an output port 16A at the bottom of the body. A vent channel 14 runs through the body between an output 16113 at the top of the body to an input port at the bottom of the body. The generally flat surface of the bottom of the body comprises a protrusion 12, shown between the output port 16A and the input port 11A. When the injector body is in position within the first cavity, the bottom surface of the body provides an injection space between the bottom 15 of the body and the exposed surface 17 of the interior sealing (1) (see FIG. 9) since only the protrusion 12 abuts the interior sealing layer (1).

Figure 7:
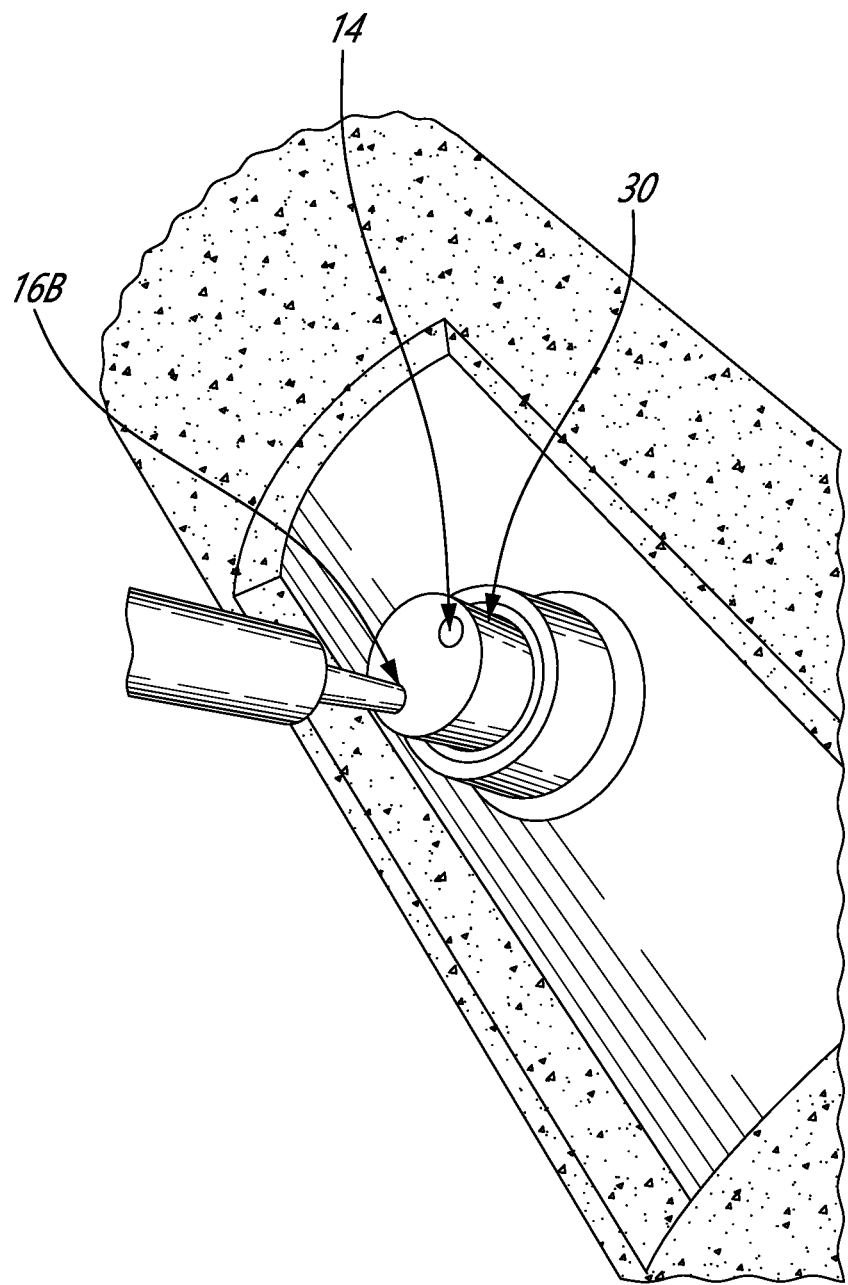
FIG. 7 and FIG. 8 show sealant injection according to an embodiment of an aspect of the present disclosure.
Figure 8:
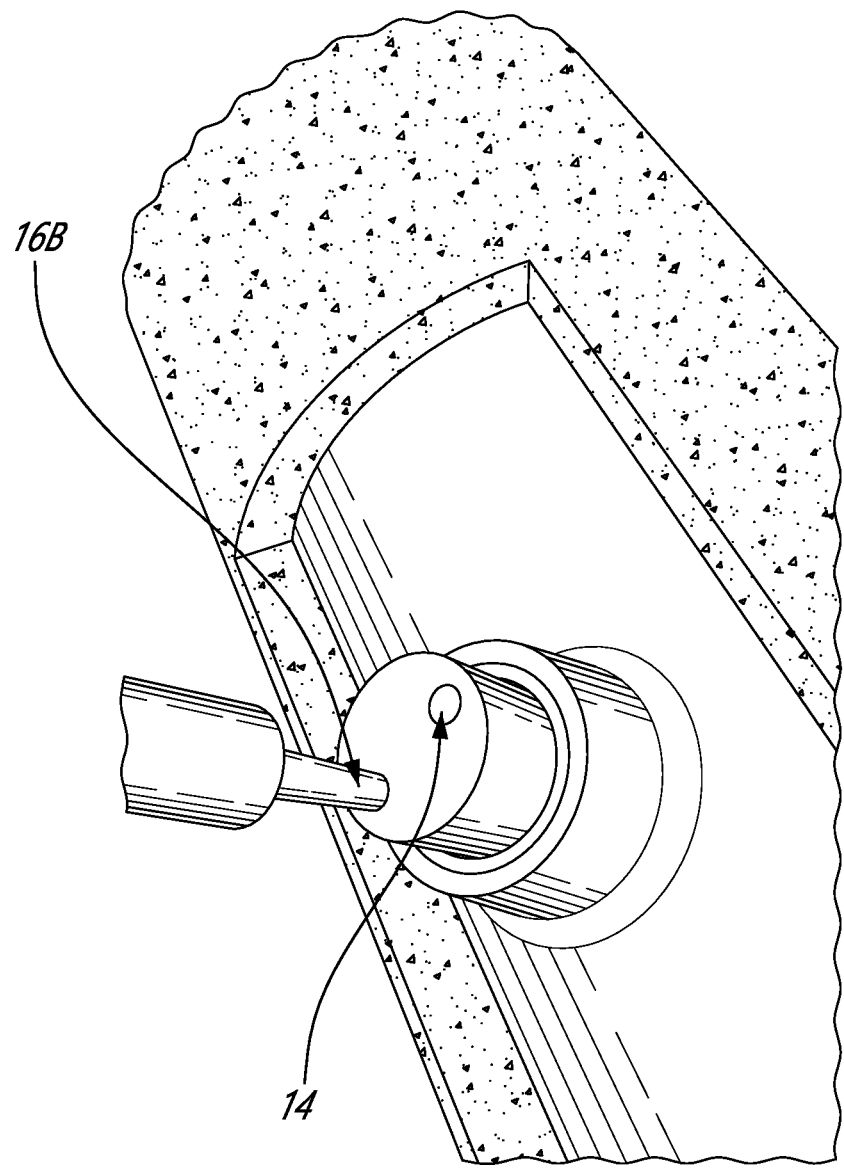
Figure 9:
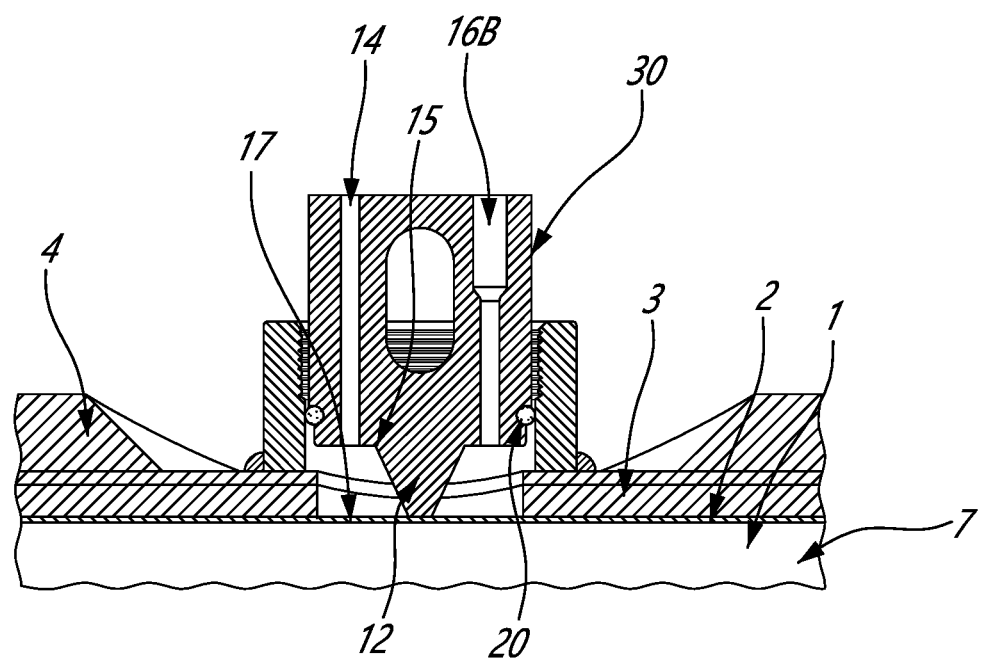
FIG. 9 is a section view of an injector according to an embodiment of an aspect of the present disclosure.

In an embodiment of an aspect of the present disclosure, the injector 28 is positioned within the first cavity and the sealant is injected through the injection port 16B of the channel 16, using a syringe for example (see FIGS. 7-9). The sealant is thus guided through the channel 16 to the exposed surface 17 of the interior sealant (1) and spreads in the space provided by the spacer 12 and over the lateral wall surface of the first cavity drilled through the wall of the steel cylinder (3) and the internal cement mortar lining (2) and interfaces therebetween, the channel 14 allowing evacuating air during injection, thereby maintaining the level of sealant high enough so that the injection space provided by the injector 28 is completely filled with sealant and the first cavity of the drilled pipe is filled uniformly with the sealant, sealant in excess flowing out of the injector 28 through the channel 14 (see FIG. 8). FIGS. 8, 9, and 11-13 show sealant injection according to an embodiment of an aspect of the present disclosure.

Once the sealant uniformly seals the walls of the first cavity, including all interfaces between the different layers within, with a sealant coating of constant thickness, the injector is removed from the coupling 30; by grasping a first cavity 18 within the body 120 of the injector 28 (see FIG. 5) for example.

The interior sealing layer (1) and the internal sheath (7) are then drilled through to form a second cavity of a diameter smaller than the diameter of the first cavity previously drilled through the wall of the steel cylinder (3) and the internal cement mortar lining (2), thereby providing a sealed passageway to the inside of the pipe, since the wall of the first cavity is sealed by the sealant. A service pipe may then be mounted to the coupling 30 for connection in flow communication to the inside of the pipe as described hereinabove. Under tests of water tightness as described hereinabove, by pressurization of the pipe using water at pressures from 25 psi to 150 psi, for short periods from 5 to 60 minutes, and periods of time between 1 day and 1 week, no water leakage is observed through the windows, showing a sustained effective liquid tight taping access to the inside of the pipe under pressure.

Figure 10:
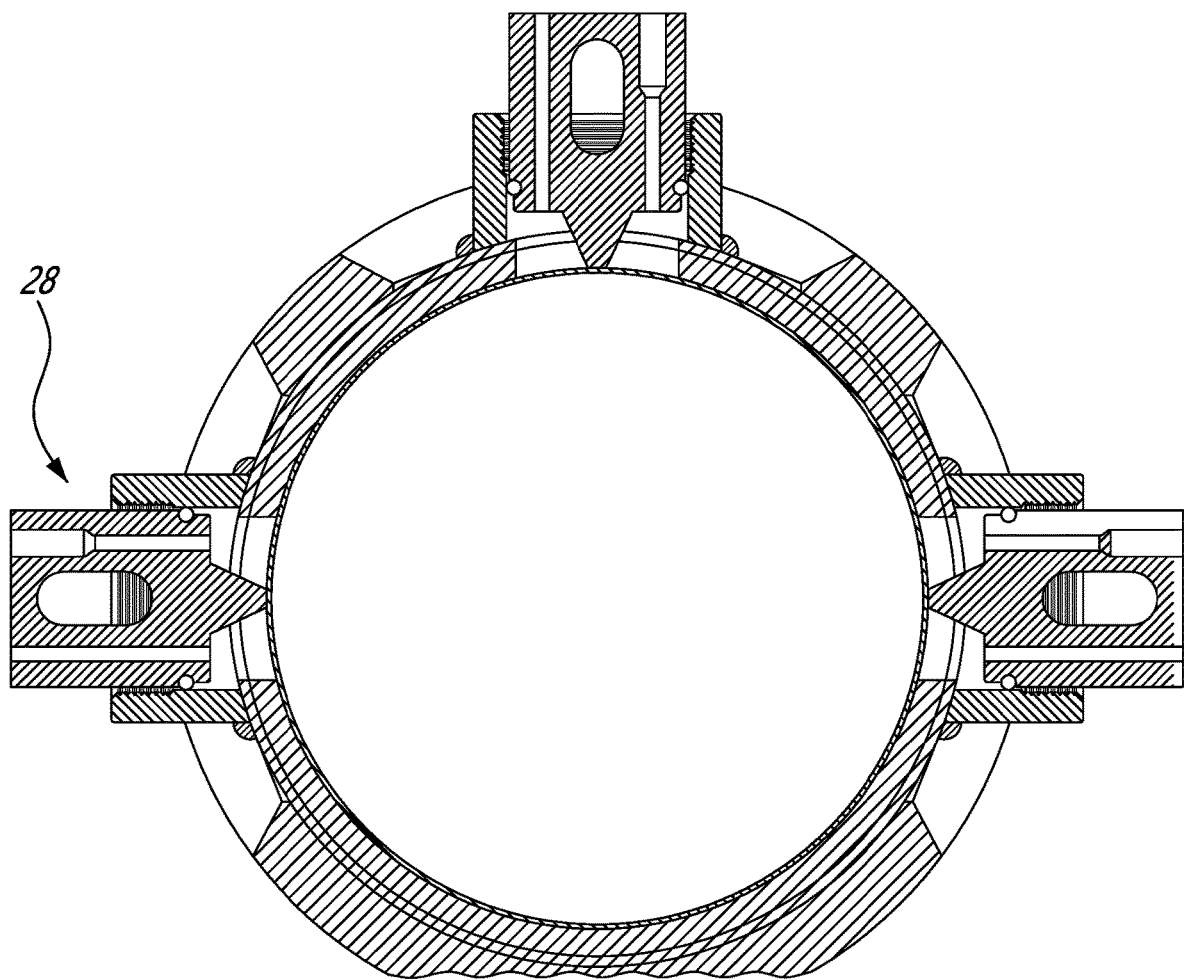
FIG. 10 shows an injector according to an embodiment of an aspect of the present disclosure, mounted on the same pipe in three positions, at 12 o'clock, 3 o'clock and 9 o'clock.
Figure 11:
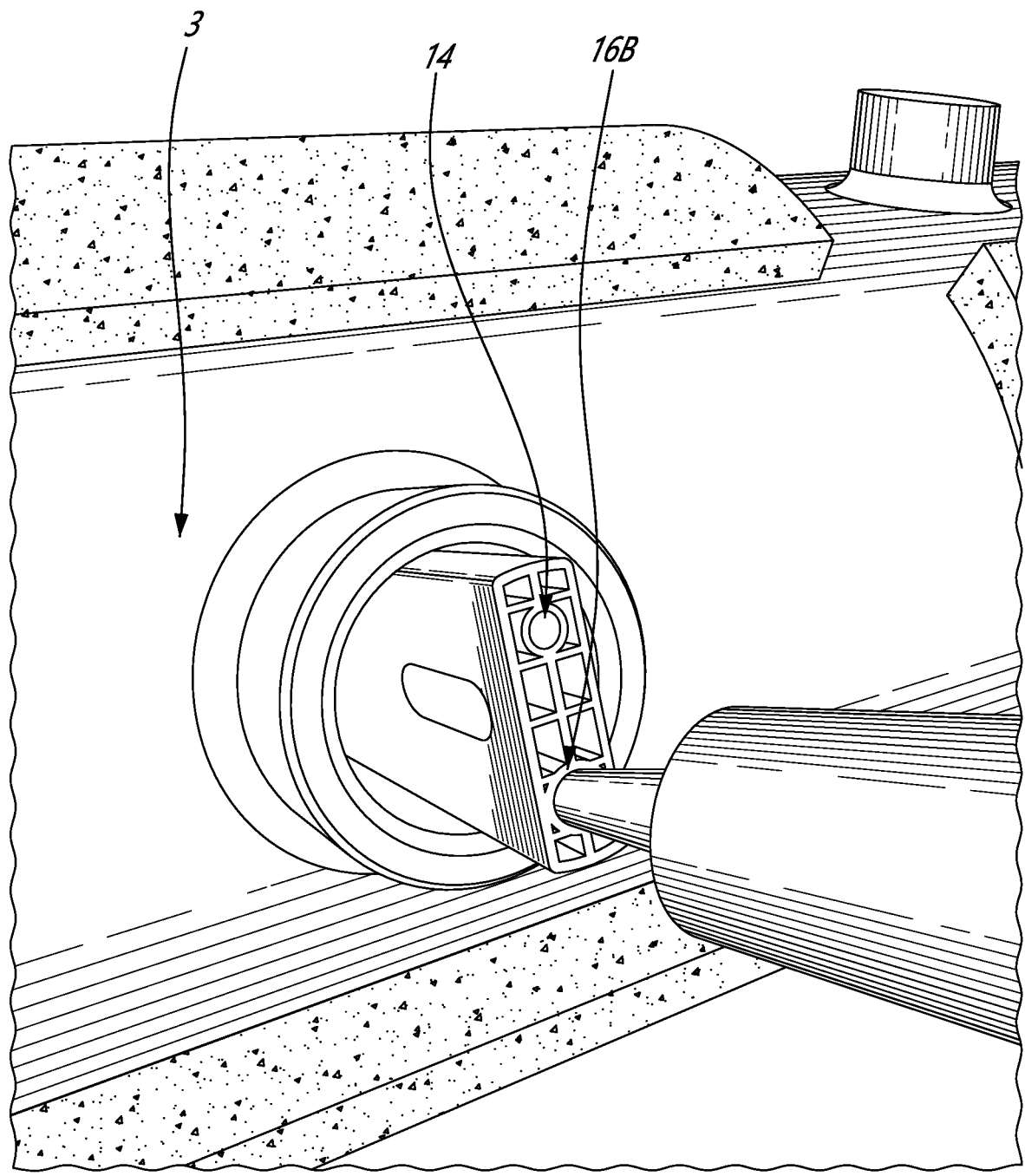
Figure 12:
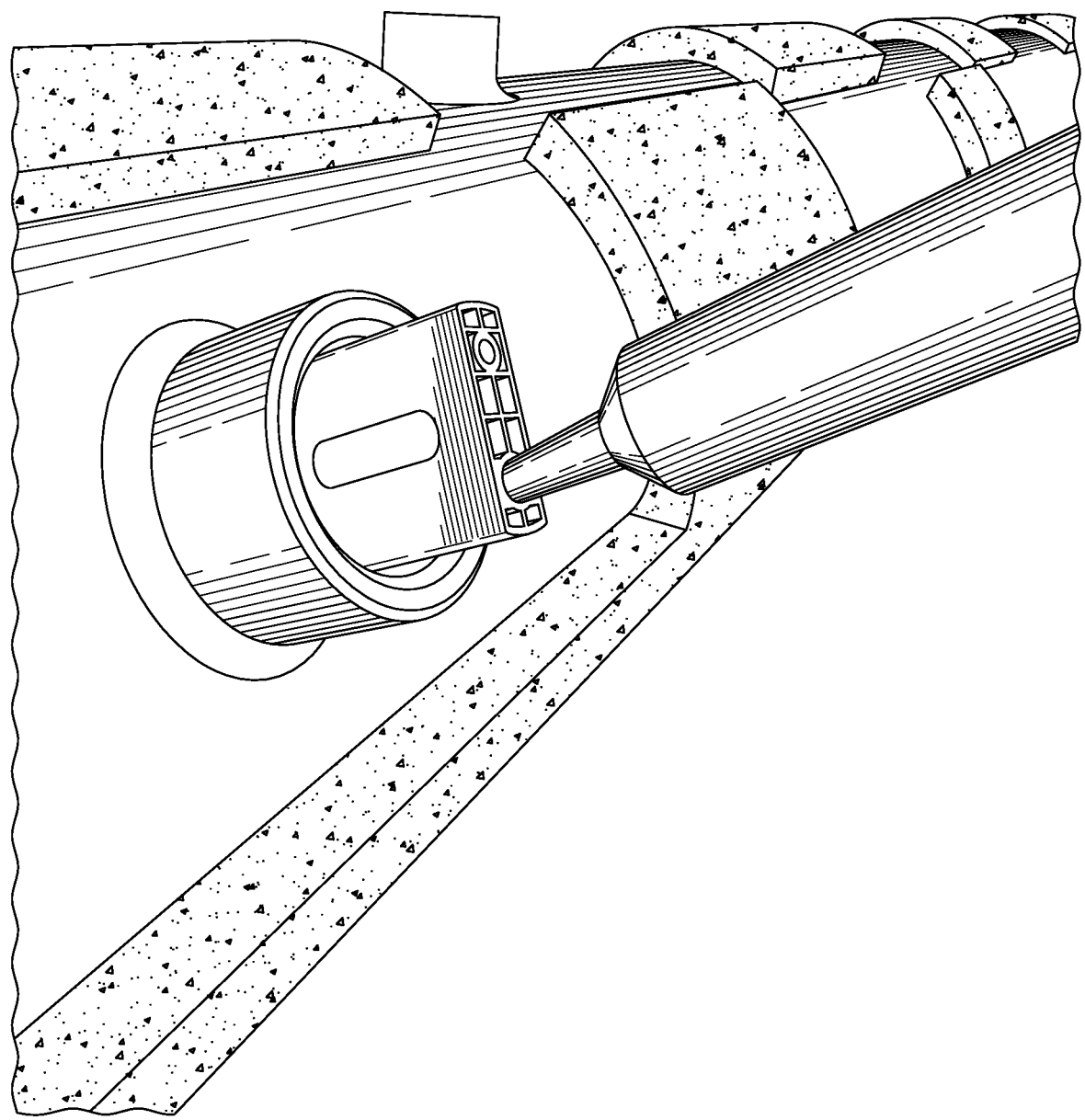

The injector may be used at angles between 9 o'clock and 3 o'clock relative to the normal of the surface of the pipe, in relation to positions of the taps to be provided (see FIG. 10 for example).

In an embodiment of an aspect of the present disclosure, a pipe comprising concentric layers including layers of porous materials and a sealing interior layer is internally lined with a fluid-tight sheath. Then, in a first drilling pass, the layers of the pipe are drilled through down to the outer surface of the sealing interior layer, until exposing the outer surface of the sealing interior layer, without piercing the sealing interior layer, and a sealant is injected through the thus drilled first cavity to seal the walls of the first cavity, i.e. the exposed surfaces of the different drilled-through layers of the pipe and the interfaces between the different drilled-through layers of the pipe in the first cavity. Once the sealant uniformly thus seals the walls of the first cavity, a second cavity is drilled within the first cavity through the sealing interior layer and the fluid tight sheath to the inside of the pipe.

In an embodiment of an aspect of the present disclosure, the sealant is directed by an injector to the surface of the interior layer and over the wall surfaces of the first cavity, and cured, and the injector is removed.

The scope of the claims should not be limited by the embodiments set forth in the examples but should be given the broadest interpretation consistent with the description as a whole.

The invention claimed is:

1. A method for pressure pipe drilling a pipe comprising an exterior layer and an interior layer, the method comprising:
   internally lining the interior layer with a fluid-tight sheath;
   drilling a first cavity through the exterior layer until exposing an outer surface of the interior layer;
   injecting a sealant into the first cavity; and
   drilling a second cavity within the first cavity through the interior layer and the fluid-tight sheath, thereby providing a sealed passageway to an inside of the pipe for flow communication to the inside of the pipe.

2. The method of claim 1, wherein the fluid-tight sheath is a cured-in place sheath.

3. The method of claim 1, comprising positioning an injector in the first cavity, a bottom surface of the injector comprising a protrusion, and injecting the sealant through the injector in an injection space provided by the protrusion between the bottom surface of the injector and the outer surface of the interior layer once exposed and over surfaces of the first cavity.

4. The method of claim 1, wherein the sealant is a curable material.

5. The method of claim 1, wherein the sealant is an epoxy resin.

6. The method of claim 1, wherein the sealant is one of: foams and cements.

7. The method of claim 1, wherein the sealant is a material confinable by walls of the first cavity.

8. The method of claim 1, wherein the exterior layer comprises a steel cylinder coated with a concentric exterior concrete coating and lined with an internal cement mortar lining.

9. The method of claim 1, wherein the exterior layer comprises a steel cylinder coated with a concentric exterior concrete coating and lined with an internal cement mortar lining, the method comprising, once the first cavity is drilled and the sealant seals interfaces between the steel cylinder and the internal cement mortar liner within the first cavity, drilling the second cavity.

10. The method of claim 1, wherein the exterior layer comprises a steel cylinder coated with a concentric exterior concrete coating and lined with an internal cement mortar lining, the method comprising drilling the exterior concrete coating, positioning a coupling on the steel cylinder; drilling the steel cylinder and the internal cement mortar lining, and fixing a tapping valve on the coupling, the sealant sealing interfaces between the coupling and the steel cylinder and interfaces between the steel cylinder and the internal cement mortar liner within the first cavity.

11. The method of claim 1, wherein the exterior layer comprises a steel cylinder coated with a concentric exterior concrete coating and lined with an internal cement mortar lining, the method comprising drilling the exterior concrete coating, welding a coupling on the steel cylinder; and sealing interfaces between the coupling and the steel cylinder, the sealant sealing interfaces between the coupling and the steel cylinder and interfaces between the steel cylinder and the internal cement mortar liner within the first cavity.

12. The method of claim 1, wherein the exterior layer comprises a steel cylinder coated with a concentric exterior concrete coating and lined with an internal cement mortar lining, the method comprising drilling the exterior concrete coating, welding a coupling on the steel cylinder by one of: stick-shielded metal arc welding, gas metal arc welding, gas tungsten arc welding, and flux-cored arc welding; and sealing interfaces between the coupling and the steel cylinder, the sealant sealing interfaces between the coupling and the steel cylinder and interfaces between the steel cylinder and the internal cement mortar liner within the first cavity.

13. The method of claim 1, wherein the exterior layer comprises a steel cylinder coated with a concentric exterior concrete coating and lined with an internal cement mortar lining and pre-existing taps.

14. The method of claim 1, wherein said step of injecting the sealant into the first cavity comprises guiding the sealant to the outer surface of the interior layer once exposed and over the walls of the first cavity.

15. A method for pressure pipe drilling a pipe, the pipe comprising an exterior layer and an interior layer, the method comprising internally lining the interior layer with a fluid-tight sheath, drilling to expose an outer surface of the interior layer thereby forming a first cavity, sealing walls of the first cavity, and drilling a second cavity in the first cavity through the interior layer and the fluid tight sheath, the second cavity opening inside the pipe.

16. The method of claim 15, wherein the fluid-tight sheath is a cured-in place sheath.

17. The method of claim 15, wherein the exterior later comprises a steel cylinder coated with a concentric exterior concrete coating and lined with an internal cement mortar lining.

18. The method of claim 15, wherein the fluid-tight sheath is a double layer, seamless tubular woven fabric with a polymeric membrane and impregnated with resin, said internally lining the interior layer comprising inserting the fluid-tight sheath inside the pipe and curing the resin by circulating heated water.

19. The method of claim 15, wherein the external later comprises a steel cylinder coated with an exterior concrete coating and lined with an internal cement mortar lining, and said drilling the first cavity comprises drilling through the exterior concrete coating, welding a coupling on an outer surface of the exterior concrete coating, drilling through the exterior concrete coating, the internal cement mortar lining and the interior layer until exposing an outer surface of the interior sealing layer; said injecting the sealant into the first cavity comprises casting the sealant into the first cavity to wet and impregnate walls of the first cavity, an interface between the coupling (30) and the exterior concrete coating and an interface between the steel cylinder (3) and the internal cement mortar lining.

20. The method of claim 15, wherein the external later comprises a steel cylinder coated with an exterior concrete coating and lined with an internal cement mortar lining, and said drilling the first cavity comprises drilling through the exterior concrete coating, welding a coupling on an outer surface of the exterior concrete coating, drilling through the exterior concrete coating, the internal cement mortar lining and the interior layer until exposing an outer surface of the interior sealing layer; said injecting the sealant into the first cavity comprises casting the sealant into the first cavity to wet and impregnate walls of the first cavity, an interface between the coupling and the exterior concrete coating and an interface between the steel cylinder and the internal cement mortar lining; the first cavity having a first diameter and the second cavity having a second diameter smaller than the first diameter.

* * * * *